(12) United States Patent
Shanmugasundaram

(10) Patent No.: US 11,847,679 B2
(45) Date of Patent: Dec. 19, 2023

(54) PERSONA BASED CO-OPERATIVE MULTI-AGENT REINFORCEMENT LEARNING TO ENHANCE USER EXPERIENCE

(71) Applicant: Dell Products, L.P., Round Rock, TX (US)

(72) Inventor: Priya Shanmugasundaram, Bangalore (IN)

(73) Assignee: DELL PRODUCTS, L.P., Round Rock, TX (US)

( * ) Notice: Subject to any disclaimer, the term of this patent is extended or adjusted under 35 U.S.C. 154(b) by 113 days.

(21) Appl. No.: 17/538,425

(22) Filed: Nov. 30, 2021

(65) Prior Publication Data
US 2023/0169560 A1  Jun. 1, 2023

(51) Int. Cl.
*G06Q 30/02* (2023.01)
*G06Q 30/0601* (2023.01)
*G06Q 30/0251* (2023.01)
*G06F 16/957* (2019.01)
*G06Q 30/0207* (2023.01)

(52) U.S. Cl.
CPC ..... *G06Q 30/0623* (2013.01); *G06F 16/9577* (2019.01); *G06Q 30/0239* (2013.01); *G06Q 30/0253* (2013.01); *G06Q 30/0255* (2013.01); *G06Q 30/0269* (2013.01)

(58) Field of Classification Search
CPC ........... G06Q 30/0623; G06Q 30/0239; G06Q 30/0253; G06Q 30/0255; G06Q 30/0207–30/0277; G06F 16/9577
See application file for complete search history.

(56) References Cited

U.S. PATENT DOCUMENTS

| | | | | |
|---|---|---|---|---|
| 6,571,216 | B1 * | 5/2003 | Garg | G06Q 30/02 |
| | | | | 705/14.39 |
| 9,390,181 | B1 * | 7/2016 | Kotas | G06Q 30/0277 |
| 11,367,120 | B2 * | 6/2022 | Gupta | A63F 13/61 |
| 11,429,869 | B2 * | 8/2022 | Chen | G06F 18/24137 |
| 11,487,972 | B2 * | 11/2022 | Mase | G06F 18/217 |
| 11,508,480 | B2 * | 11/2022 | Upadhyay | G16H 50/20 |
| 11,599,927 | B1 * | 3/2023 | Flunkert | G06N 3/0442 |
| 2007/0239522 | A1 * | 10/2007 | Kunz | G06Q 30/02 |
| | | | | 705/14.66 |

(Continued)

*Primary Examiner* — Thuy N Nguyen
(74) *Attorney, Agent, or Firm* — Amin, Turocy & Watson, LLP

(57) ABSTRACT

A system can determine a first persona for a user identity. The system can generate a web page based on the first persona, wherein respective reinforcement learning agents determine respective content of respective content modules of the website, wherein the reinforcement agents operate on an environment that comprises a group of states, a group of actions, and a group of rewards that are based on the group of states, and respective actions of the group of actions, and wherein a reward of the respective reinforcement learning agents that is increased via reinforcement learning is based on a sum of respective rewards of the respective reinforcement learning agents in transitioning the user identity to a second persona with respect to the website. The system can, in response to receiving first action data indicative of user identity interaction with the web page, transition the user identity to the second persona.

20 Claims, 10 Drawing Sheets

(56) References Cited

U.S. PATENT DOCUMENTS

| | | | | |
|---|---|---|---|---|
| 2011/0066497 | A1* | 3/2011 | Gopinath | G06Q 30/02 |
| | | | | 705/14.53 |
| 2011/0258039 | A1* | 10/2011 | Patwa | G06Q 30/00 |
| | | | | 705/14.45 |
| 2014/0095259 | A1* | 4/2014 | Weiss | G06Q 30/0211 |
| | | | | 705/7.32 |
| 2014/0123031 | A1* | 5/2014 | Postrel | G06F 3/0484 |
| | | | | 715/753 |
| 2015/0081349 | A1* | 3/2015 | Johndrow | G06Q 20/405 |
| | | | | 705/5 |
| 2017/0345059 | A1* | 11/2017 | Daniel | H04L 51/52 |
| 2018/0374138 | A1* | 12/2018 | Mohamed | G06N 20/00 |
| 2020/0159501 | A1* | 5/2020 | Bodin | G06Q 10/101 |
| 2022/0358550 | A1* | 11/2022 | Endo | G06V 20/53 |

\* cited by examiner

700

(702)

DETERMINING A FIRST PERSONA FOR A USER IDENTITY THAT HAS REQUESTED TO ACCESS A WEBSITE 704

GENERATING A WEB PAGE FOR THE WEBSITE BASED ON THE FIRST PERSONA, WHEREIN RESPECTIVE REINFORCEMENT LEARNING AGENTS DETERMINE RESPECTIVE CONTENT OF RESPECTIVE CONTENT MODULES OF THE WEBSITE, WHEREIN THE RESPECTIVE REINFORCEMENT AGENTS OPERATE ON AN ENVIRONMENT THAT COMPRISES A GROUP OF STATES, A GROUP OF ACTIONS, AND A GROUP OF REWARDS THAT ARE BASED ON RESPECTIVE STATES OF THE GROUP OF STATES, AND RESPECTIVE ACTIONS OF THE GROUP OF ACTIONS, AND WHEREIN A REWARD OF THE RESPECTIVE REINFORCEMENT LEARNING AGENTS THAT IS INCREASED VIA REINFORCEMENT LEARNING IS BASED ON A SUM OF RESPECTIVE REWARDS OF THE RESPECTIVE REINFORCEMENT LEARNING AGENTS IN TRANSITIONING THE USER IDENTITY TO A SECOND PERSONA WITH RESPECT TO THE WEBSITE 706

IN RESPONSE TO RECEIVING FIRST ACTION DATA INDICATIVE OF USER IDENTITY INTERACTION WITH THE WEB PAGE, TRANSITIONING THE USER IDENTITY TO THE SECOND PERSONA WITH RESPECT TO THE WEBSITE 708

PERSONA BASED CO-OPERATIVE MULTI-AGENT REINFORCEMENT LEARNING TO ENHANCE USER EXPERIENCE

BACKGROUND

A web server can serve web pages of a web site to a user. The web server can customize these web pages to the user.

SUMMARY

The following presents a simplified summary of the disclosed subject matter in order to provide a basic understanding of some of the various embodiments. This summary is not an extensive overview of the various embodiments. It is intended neither to identify key or critical elements of the various embodiments nor to delineate the scope of the various embodiments. Its sole purpose is to present some concepts of the disclosure in a streamlined form as a prelude to the more detailed description that is presented later.

An example system can operate as follows. The system can determine a first persona for a user identity that has requested to access a website. The system can generate a web page for the website based on the first persona, wherein respective reinforcement learning agents determine respective content of respective content modules of the website, wherein the respective reinforcement agents operate on an environment that comprises a group of states, a group of actions, and a group of rewards that are based on respective states of the group of states, and respective actions of the group of actions, and wherein a reward of the respective reinforcement learning agents that is increased via reinforcement learning is based on a sum of respective rewards of the respective reinforcement learning agents in transitioning the user identity to a second persona with respect to the website. The system can, in response to receiving first action data indicative of user identity interaction with the web page, transition the user identity to the second persona with respect to the website.

An example method can comprise determining, by a system comprising a processor, a first persona for a user identity that accesses a user interface. The method can further comprise generating, by the system, user interface data for the user interface based on the first persona, wherein respective reinforcement learning agents determine respective content of respective portions of the user interface, wherein a reward of the respective reinforcement learning agents that is increased via reinforcement learning is a function of a sum of respective rewards of the respective reinforcement learning agents in moving the user identity to a second persona with respect to the user interface. The method can further comprise, in response to receiving first action data indicative of user identity interaction with the user interface, moving, by the system, the user identity to the second persona with respect to the user interface.

An example non-transitory computer-readable medium can comprise instructions that, in response to execution, cause a system comprising a processor to perform operations. These operations can comprise generating user interface data for a user interface based on a first persona that is associated with a user identity, wherein respective reinforcement learning agents determine respective content of respective portions of the user interface, wherein a reward of the respective reinforcement learning agents is increased via reinforcement learning, and wherein the reward is a sum of respective rewards of the respective reinforcement learning agents in migrating the user identity to a second persona with respect to the user interface. These operations can further comprise, in response to receiving first action data indicative of user identity interaction with the user interface, migrating the user identity to the second persona with respect to the user interface.

BRIEF DESCRIPTION OF THE DRAWINGS

Numerous embodiments, objects, and advantages of the present embodiments will be apparent upon consideration of the following detailed description, taken in conjunction with the accompanying drawings, in which like reference characters refer to like parts throughout, and in which:

FIG. 7 illustrates an example process flow that can facilitate persona based co-operative multi-agent reinforcement learning, in accordance with an embodiment of this disclosure;

DETAILED DESCRIPTION

Overview

Figure 1:
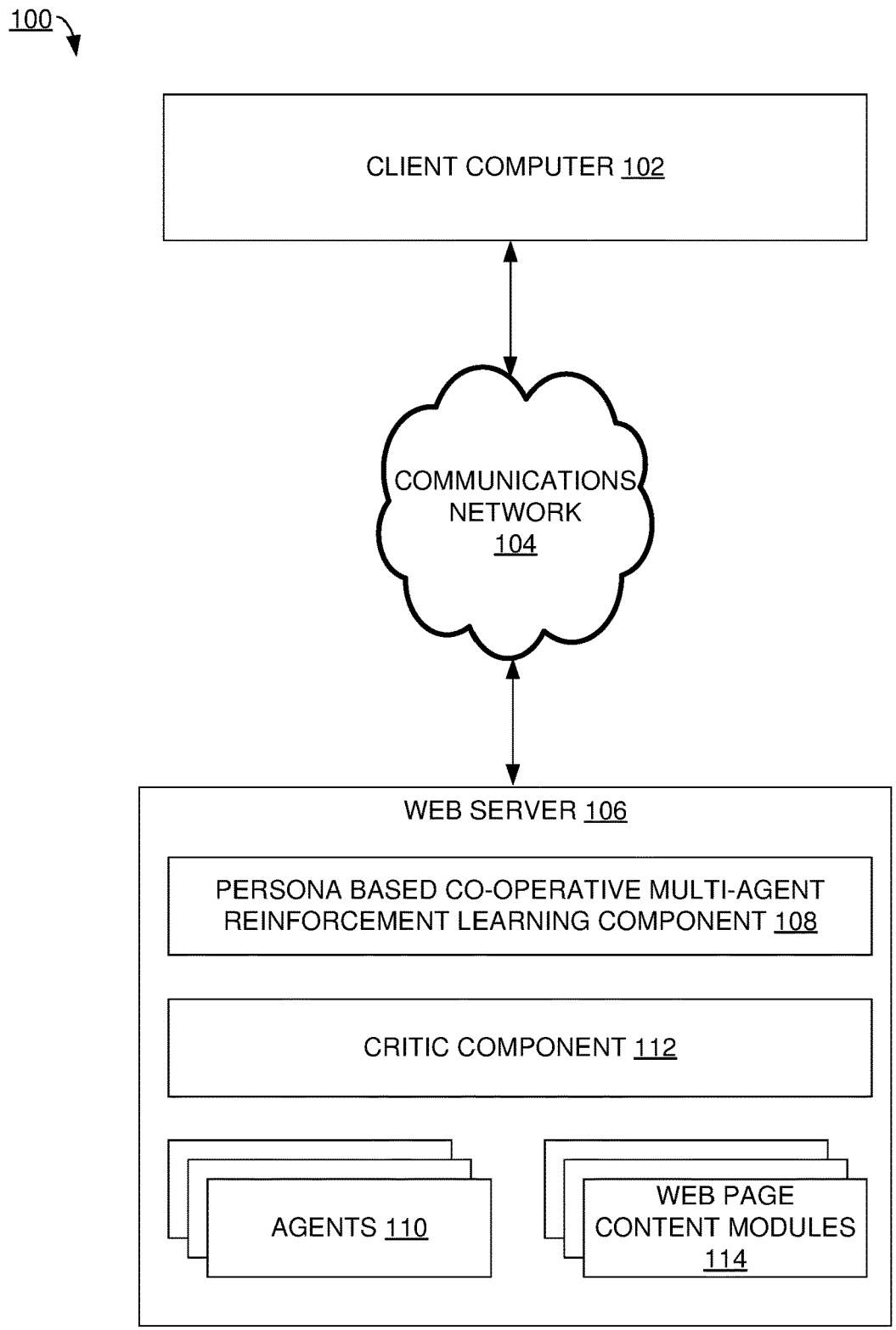
FIG. 1 illustrates an example system architecture that can facilitate persona based co-operative multi-agent reinforcement learning, in accordance with an embodiment of this disclosure.

Web pages can be a primary point of interaction with users. The ways in which the information can be presented to a user through a webpage can be of crucial importance to user experience and to the web page provider. It can be that users pay minimal attention to exhaustive and irrelevant content on webpages. A way to engage users with a web page can involve delivering content dynamically, that is tailor-made for the user, and provides the necessary nudge over subsequent visits to increase the user's intent to make a purchase.

In some examples, web pages can be composed of different content modules. For example, a home page of a website can be said to have a module which holds a search bar, a logo, and sign-in icons, etc. This web page can also contain other modules that show Product and Deals banners with links to "Shop" pages and "Learn More" pages. In examples according to the present techniques, co-operative multi-agent reinforcement learning strategies can be utilized, where each of the modules present on a particular page co-operatively learn to enhance user experience on that page using a global reward. This global reward can be modelled in a way to optimize a user experience on the page and to drive users down a purchase funnel over subsequent visits.

Reinforcement learning systems can learn by interacting and receiving feedback on their interactions with the environment. These systems can also be capable of co-operation and competition through a paradigm of multi-agent reinforcement learning. Multi-agent systems can use reinforcement learning to learn optimal behavior by performing actions that enhance a collective reward (co-operative) or an independent reward (competitive) of the agents. In some examples, these approaches can provide advantages over supervised and unsupervised learning approaches, as they can be capable of learning in dynamically changing situations, not limited by datasets and able to learn the impact of current actions on future states of the environment.

The present techniques can be utilized to implement a hybrid supervised-multi-agent reinforcement learning system that personalizes user experience on the site. The present techniques can be utilized to increase a user's intent to make a purchase over subsequent visits. In greedy approaches, a user can be bombarded with information to incentivize only the current visit. This inability of greedy approaches to forego immediate reward for higher future reward can be a problem because they can be sub-optimal at leading to a user purchase. Instead, the present techniques can be utilized to gradually nudge a user over visits to make a purchase, and impact key performance indicators (KPIs) like user lifetime value, loyalty, and retention rates.

The present techniques can be implemented to identify a user's level of intent to purchase, and henceforth optimize its experience on certain areas of a web site to increase its intent over subsequent visits. Pain points for users coming to e-commerce websites can be intent, content, and experience. User intent to make a purchase can differ widely. For example, some users can be browsing without a specific intent to purchase, while other users can have a specific product in mind for purchase. A user's intent level can be determined to understand the user's behavior. Users can prefer relevant content, so the content on a website can be customized to a user's preferences and level of intent to enhance user experience. Where a user has a good experience on a site, this good experience can cause the user to subsequently visit the site, or increase an intent to make a purchase.

The present techniques can be implemented to deliver content dynamically such that it enhances intent, content, and experience. In some examples, changes to content on a website are run as A/B tests, where the unchanged version is shown to a section of users and the changed version is shown to a different section of users. The A/B test can be run over a period of time and KPIs like clickthrough rate, conversion, and revenue can be monitored for the two sections. After the A/B test is completed, the section that sees desirable performance in terms of the KPIs can be implemented.

Supervised and unsupervised machine learning techniques can be used to deliver content on a module level, such as with recommender systems, targeted banners, or assisted search systems. But, in some examples, these techniques are not widely used to deliver content at a page level because they cannot learn an impact of their predictions on the other content modules. The present techniques can be implemented with a hybrid supervised-multi-agent reinforcement learning technique, which can overcome drawbacks with prior approaches.

There can be a need for solutions to web page content selection that are capable of building a visit-on-visit relationship with users by delivering content that is suited for their needs and enhances their user experiences. In some examples, when the content on the website is modified, the changes are run as A/B/n tests, and an efficacy of the original and the modified version in achieving key KPIs by exposing users to these changes can be examined. These tests can be time-consuming and also lead to decreased revenue where users are provided with a sub-optimal experience on the site via one of the recipes, A or B, that is less likely to lead to a sale. Also, existing machine learning solution techniques can be based on greedy approaches that work on a "single-visit maximum impact" logic, which can ignore the user's long-term bond with the brand and the business.

There can be problems with prior techniques for testing and experimentation. In prior techniques, content changes can be iterated as A/B tests, where the content is changed on one module for a version of a web page, and the original version is retained separately. Equally split traffic can be exposed to the changed and original versions of the page. User experience metrics can be monitored over a period of time until sufficient data can be collected. Then, whichever version saw increased performance in terms of user experience, or another optimization objective, can be implemented. Even though a minority of the winning sect may not have liked the change, the majority's preference can be taken and implemented for all kinds of users. That can lead to a poor experience for those users who do not like the implemented version of the web page.

There can be problems with prior techniques for machine learning solutions. In some examples, existing machine learning approaches do not implement a holistic solution on a page level or visit level, as these techniques omit ability to cooperate or compete with other components of the page. In prior approaches, supervised and unsupervised learning techniques can be used for creating recommender systems, user profiling and chat assistance, but their inability to interact with other components on the page and inability to understand downstream impacts of their current actions can mean that they lead to creating web pages that are suboptimal in converting sales.

There can be problems with prior techniques for A/B/n testing, where a sizeable portion of user traffic can be exposed to a suboptimal experience, causing drops in sale conversions. There is multi-armed bandit testing, where a poor-performing section can be caught early on, with traffic diverted to better performing versions to reduce a drop in sale conversions. However, multi-armed bandit testing can be stateless, so does not attribute an impact of a user's interaction, content on the site, or other page-level metrics to a drop/lift in observed sale conversions. Rather, multi-armed bandit testing can attribute performance only to its actions, e.g., diverting traffic from one recipe to another.

According to the present techniques, a hybrid supervised-multi-agent reinforcement learning based technique can be implemented to enhance user experience and gradually nudge the user to make a purchase over subsequent visits. This approach can overcome the problems associated with prior testing and experimentation techniques, prior machine learning techniques, and multi-arm bandit testing.

A user to a website can be mapped on a basis of level of intent, and kind of content they consume from the site. On the basis of content on the site, pages of a website can be divided into categories, such as "Exploratory", "Detail" and "Checkout" pages. "Exploratory" pages can be web pages that provide many options to the user, where the content is general, such as a homepage, a segment homepage, learn pages, and category pages. "Detail" pages can be web pages that provide product-specific content and where a user can compare different products to make a purchase-related decision, such as product detail pages (single/multiple), compare pages, and product filter/search results pages. "Checkout" pages can be web pages where users place an order, enter shipping details, and make a payment for their order, such as a cart page, a shipping page, a payment page, and a review page.

Users can be divided into multiple types, such as based on a level of indulgence with content shown to them, and a level of intent to make a purchase from the website. In some examples, there can be three different personas—"Gazer," "Grasper," and "Purchaser." A "gazer" persona can describe users who are just looking at, and exploring, the website, with low intent of buying. A "gasper" persona can describe users who have elevated levels of buying intent and are looking at product-level information to understand specifications. A "purchaser" persona can describe users who have a highest intent of buying of the personas.

The present techniques can be implemented to move users from a "gazer" or "grasper" persona to a "purchaser" persona through exploratory or detail web pages to checkout web pages over subsequent visits. This can be accomplished by enhancing a user experience for users having these respective personas on corresponding types of pages, respectively.

The present techniques can be implemented to provide various benefits. Utilizing the present techniques can be equivalent to running multiple A/B tests at once (where each module content is changed by an agent's action), reducing lead time on decisions (dynamically learning), and each user can experience a change that it liked best. That is, utilizing the present techniques can be equivalent to running (number of changes)*(number of users) number of A/B tests, with reduced lead times and reduced revenue losses while waiting for sufficient data to be collected.

The present techniques can be considered to be far-sighted, as they can be implemented to take actions that can sacrifice immediate rewards, but enhance future rewards. This can help establish a visit-on-visit level relationship with a user, unlike with greedy approaches.

The present techniques can improve over stateless bandit approaches, as the present techniques can utilize a state definition, and incorporate state information into decisions.

The present techniques can be implemented without a defined model of the environment. That is, the present techniques can be implemented without having transitions between states being modeled in the form of a probability distribution. This can be advantageous in an e-commerce website context due a large number of states, where action pairs can increase multifold with an increase in a number of users.

The present techniques can be flexible, as a reward definition can be customized to achieve different page level optimization objectives.

The present techniques can be implemented to provide cooperative multi-agent reinforcement learning on a content module to enhance a page-level user experience. A user of cooperative multi-agent reinforcement learning on different content modules on a webpage can be beneficial. With the present techniques, multi-agent reinforcement learning systems can be used to understand a relationship between different content modules on a web page, and to perform effective content delivery to enhance user experience on a page-level. That is, a webpage can be modeled as a multi-agent system composed of different content modules (agents), and used it to achieve an optimization objective on a page level or visit level.

The present techniques can be implemented to provide a hybrid supervised-multi-agent reinforcement learning approach to identify and improve user personas. Prior approaches for user profiling and persona identification can generally be applied standalone, and the predictions from these models are used to make some rule-based changes to content shown on the page. In contrast, the present techniques can be implemented to identify users whose user experience will be enhanced by dynamic content delivery using multi-agent reinforcement learning. These techniques can be implemented to understand a transition of a user over personas due to actions taken by a multi-agent reinforcement learning system. This approach can be holistic, and close a loop for feedback between supervised learning and multi-agent reinforcement learning components.

The present techniques can provide a reward formulation to facilitate a percolation of users down a purchase funnel over visits. In contrast to other multi-agent reward definitions, in the present techniques, a reward can be incorporated for nudging users to move across personas. This reward obtained for nudging users to move to the next persona can be given an increasing weight over subsequent episodes to facilitate a smooth transition of users into the next persona though the use of systemic targeting and personalization.

The present techniques can provide for a flexible MDP definition. The present techniques can provide for redefining actions and rewards to suit different page types and persona types under consideration to better target users and achieve persona-specific optimization objectives. For exploratory pages where a primary goal can be to explore and identify more lines of business, a reward and actions can be defined differently than for detail pages, where a primary goal can be to narrow a user down to more product-specific information.

The present techniques can be implemented to enhance user experience on a page level, and nudge users to make a purchase over subsequent visits using hybrid supervised-multi-agent reinforcement learning strategies.

Example Architectures

FIG. 1 illustrates an example system architecture 100 that can facilitate persona based co-operative multi-agent reinforcement learning, in accordance with an embodiment of this disclosure.

System architecture comprises client computer 102, communications network 104, and web server 106. In turn, web server 106 comprises persona based co-operative multi-agent reinforcement learning component 108, agents 110, critic component 112, and web page content modules 114.

The primary example described herein involves an ecommerce web server that serves web pages to a user identity, and facilitates moving that user identity through multiple personas to facilitate the user identity making a purchase from the website. It can be appreciated that there can be other implementations of the present techniques, where information is presented to a user identity in a user interface and persona based co-operative multi-agent reinforcement learning is implemented to determine content to provide to the user identity.

Client computer 102 can be associated with a user identity, such as a user account that is logged into the web server, or is identified through a web cookie stored on client computer 102. In other examples, the user identity can be associated with a single session where web pages are requested from a known computer location.

Client computer 102 can request web pages from web server 106 via communications network 104, such as by clicking on hypertext links in other web pages. Web server 106 can generate these web pages and return them to client computer 102 via communications network 104.

Figure 2:
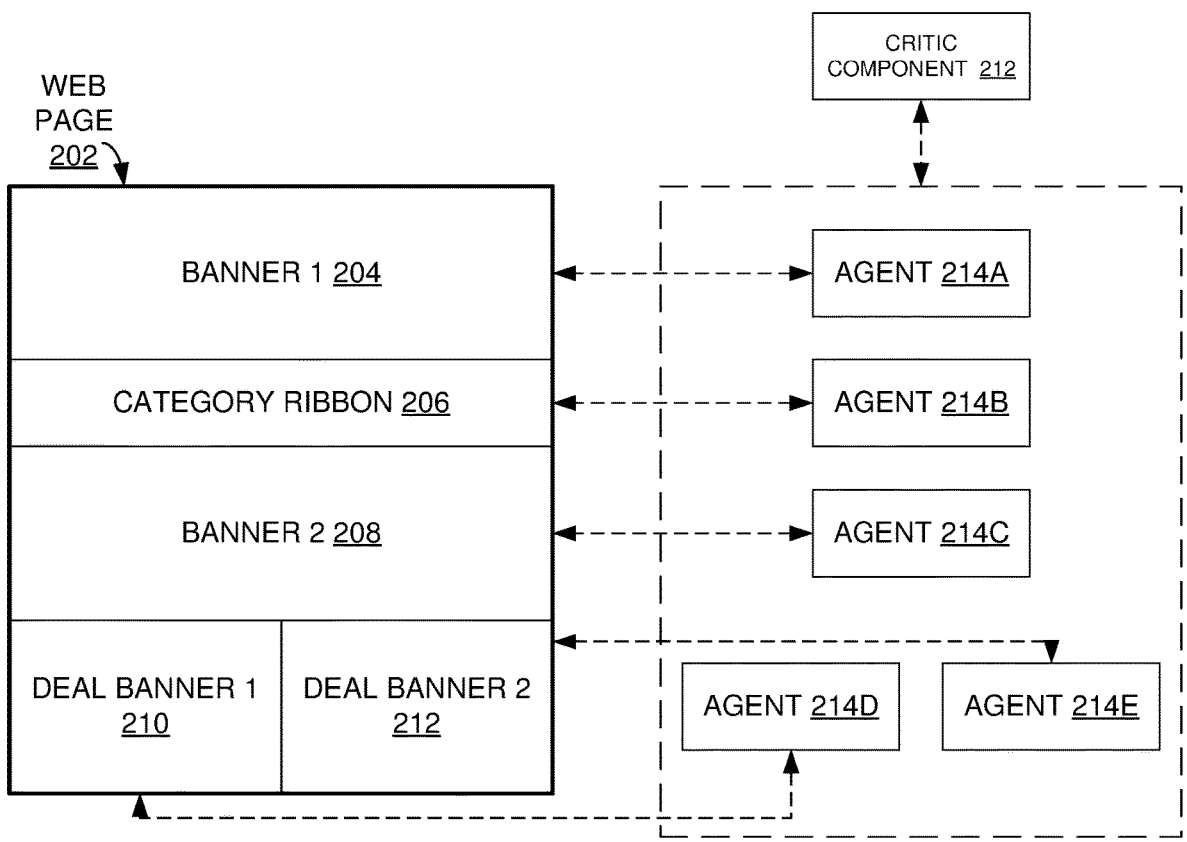
FIG. 2 illustrates an example system architecture of a web page, and that can facilitate persona based co-operative multi-agent reinforcement learning, in accordance with an embodiment of this disclosure.

Web server can generate content for these web pages in web page content modules 114 (such as described with respect to FIG. 2). Agents 110 can determine content to be provided in various of web page content modules 114. Agents 110 can implement co-operative multi-agent reinforcement learning to do this content determination, and the co-operation can be facilitated by critic component 112, and persona based co-operative multi-agent reinforcement learning component 108.

Figure 10:
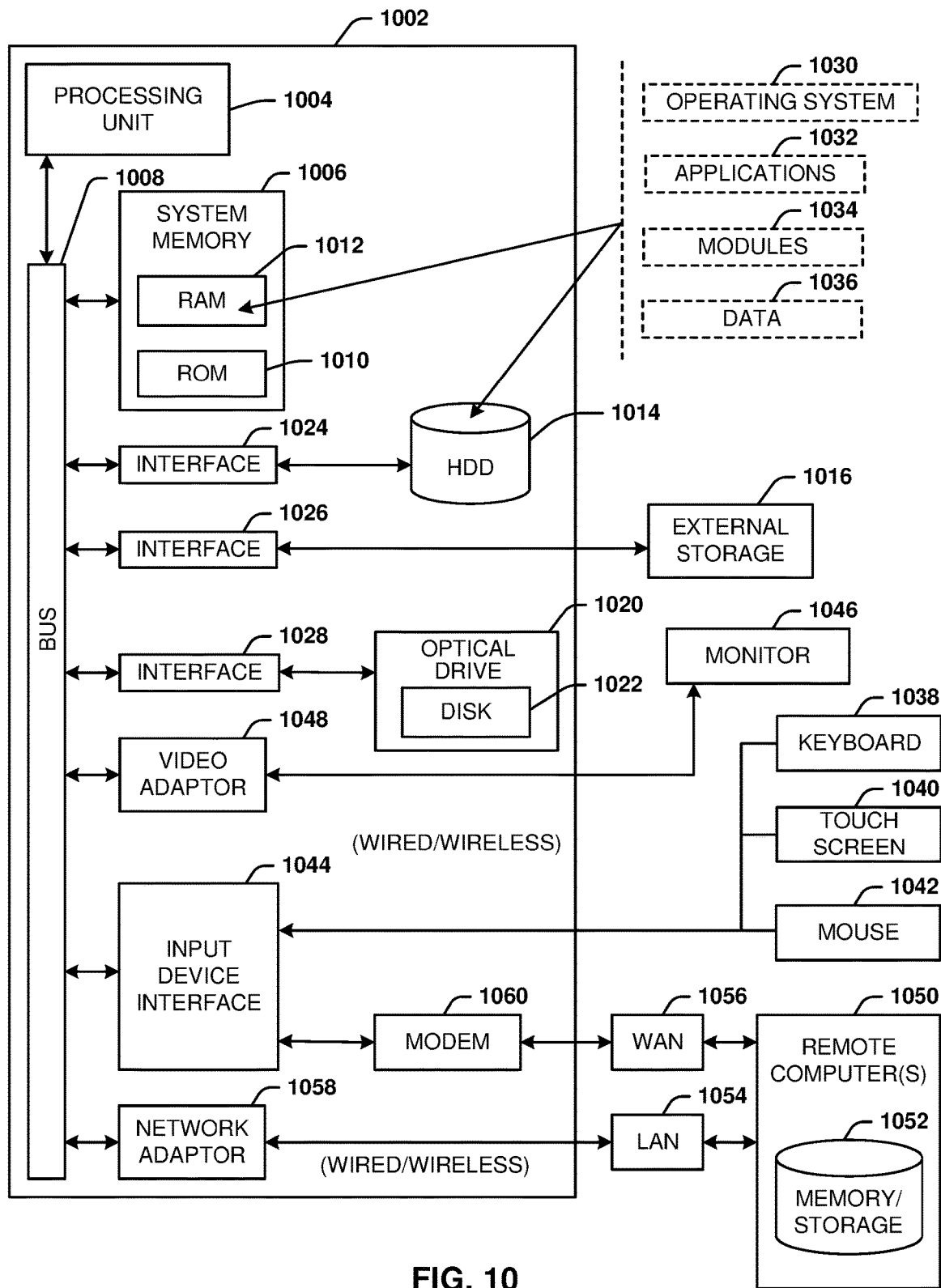
FIG. 10 illustrates an example block diagram of a computer operable to execute an embodiment of this disclosure.

Each of client computer 102 and/or web server 106 can be implemented with part(s) of computing environment 1000 of FIG. 10. Communications network 104 can comprise a computer communications network, such as the INTERNET.

Figure 8:
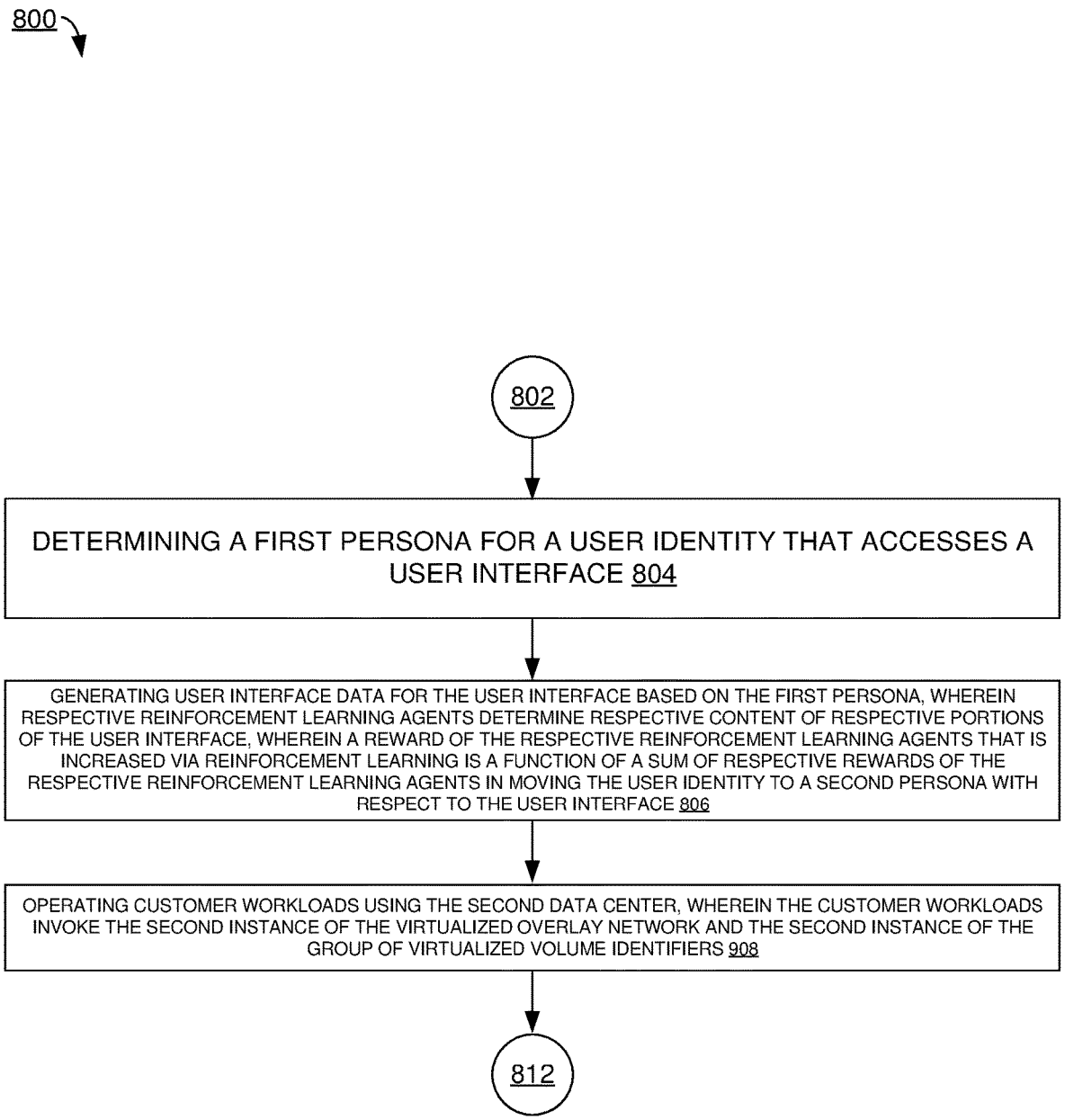
FIG. 8 illustrates another example process flow that can facilitate persona based co-operative multi-agent reinforcement learning, in accordance with an embodiment of this disclosure.
Figure 9:
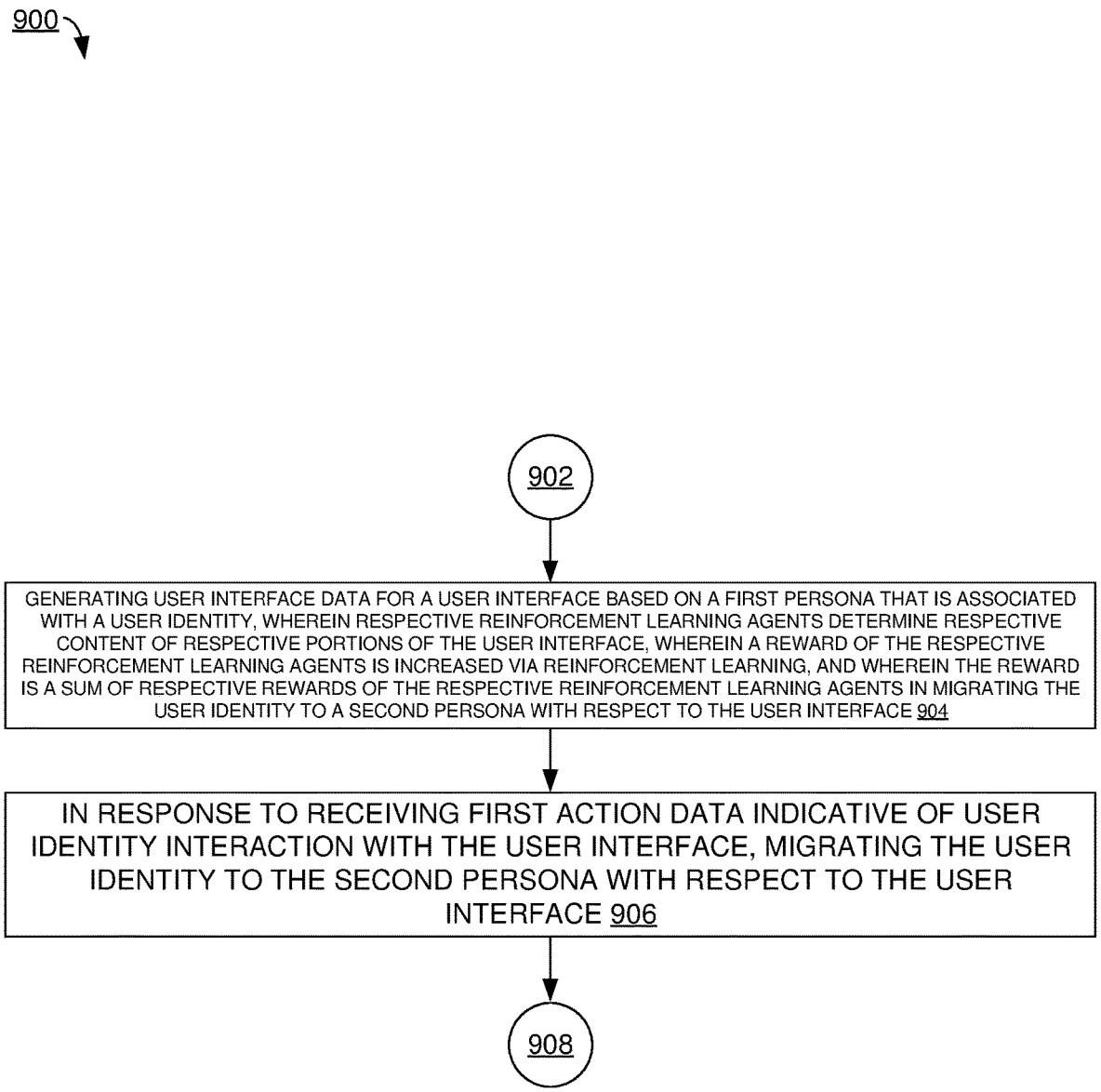
FIG. 9 illustrates another example process flow that can facilitate persona based co-operative multi-agent reinforcement learning, in accordance with an embodiment of this disclosure.

In some examples, persona based co-operative multi-agent reinforcement learning component 108 can implement part(s) of the process flows of FIGS. 7-9 to facilitate persona based co-operative multi-agent reinforcement learning.

FIG. 2 illustrates an example system architecture 200 of a web page, and that can facilitate persona based co-operative multi-agent reinforcement learning, in accordance with an embodiment of this disclosure.

System architecture comprises web page 202, critic component 212, agent 214A, agent 214B, agent 214C, agent 214D, and agent 214E. In turn, web page 202 comprises banner 1 204, category ribbon 205, banner 2 208, deal banner 1 210, and deal banner 2 212.

In some examples, web page 202 can be a web page served by web server 106 of FIG. 1; each of banner 1 204, category ribbon 205, banner 2 208, deal banner 1 210, and deal banner 2 212 contains content that are determined by one of web page content modules 114; critic component 212 is similar to critic component 112; and each of agent 214A, agent 214B, agent 214C, agent 214D, and agent 214E is similar to one of agents 110.

As depicted, each agent can determine content for a respective content module, and the agents can work co-operatively to implement reinforcement learning, as facilitated by critic component 212. Agent 214A determines content for banner 1 204. Agent 214B determines content for category ribbon 206. Agent 214C determines content for banner 2 208. Agent 214D determines content for deal banner 1 210. Agent 214E determines content for deal banner 2 212.

Each of banner 1 204, category ribbon 205, banner 2 208, deal banner 1 210, and deal banner 2 212 can have a different size on web page 202, and can present different types of content. For example, banner 1 204 can include more general informational content about a product, while deal banner 1 210 presents an offer to purchase a specific product at a particular price.

Figure 3:
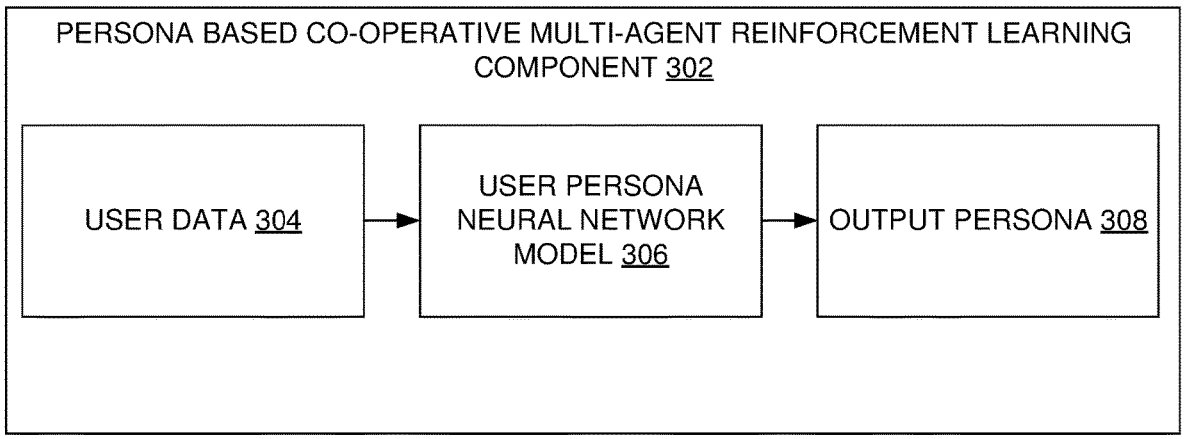
FIG. 3 illustrates an example system architecture of a persona identification neural network, and that can facilitate persona based co-operative multi-agent reinforcement learning, in accordance with an embodiment of this disclosure.

FIG. 3 illustrates an example system architecture 300 of a persona identification neural network, and that can facilitate persona based co-operative multi-agent reinforcement learning, in accordance with an embodiment of this disclosure. In some examples, system architecture 300 can be used to implement part(s) of persona based co-operative multi-agent reinforcement learning component 108 of FIG. 1.

As depicted, system architecture 300 comprises persona based co-operative multi-agent reinforcement learning component 302. In turn, persona based co-operative multi-agent reinforcement learning component 302 comprises user data 304, user persona neural network model 306, and output persona 308.

In some examples, user persona neural network model 306 takes user data 304 as input and produces output persona 308 as output. User data 304 can include information about a user identity, such as past interaction with a website data, historical data, demographic data, and purchase data. In some examples, there are N defined personas, and user persona neural network model 306 has N outputs, where one output corresponds to each persona, and wherein the output indicates a likelihood that the user data indicates that particular persona (such as a number [0, 1], where 1 indicates that it is certainly that persona). In some examples, output persona 308 can then be the persona that corresponds to the output of user persona neural network model 306 that has the highest value.

Figure 4:
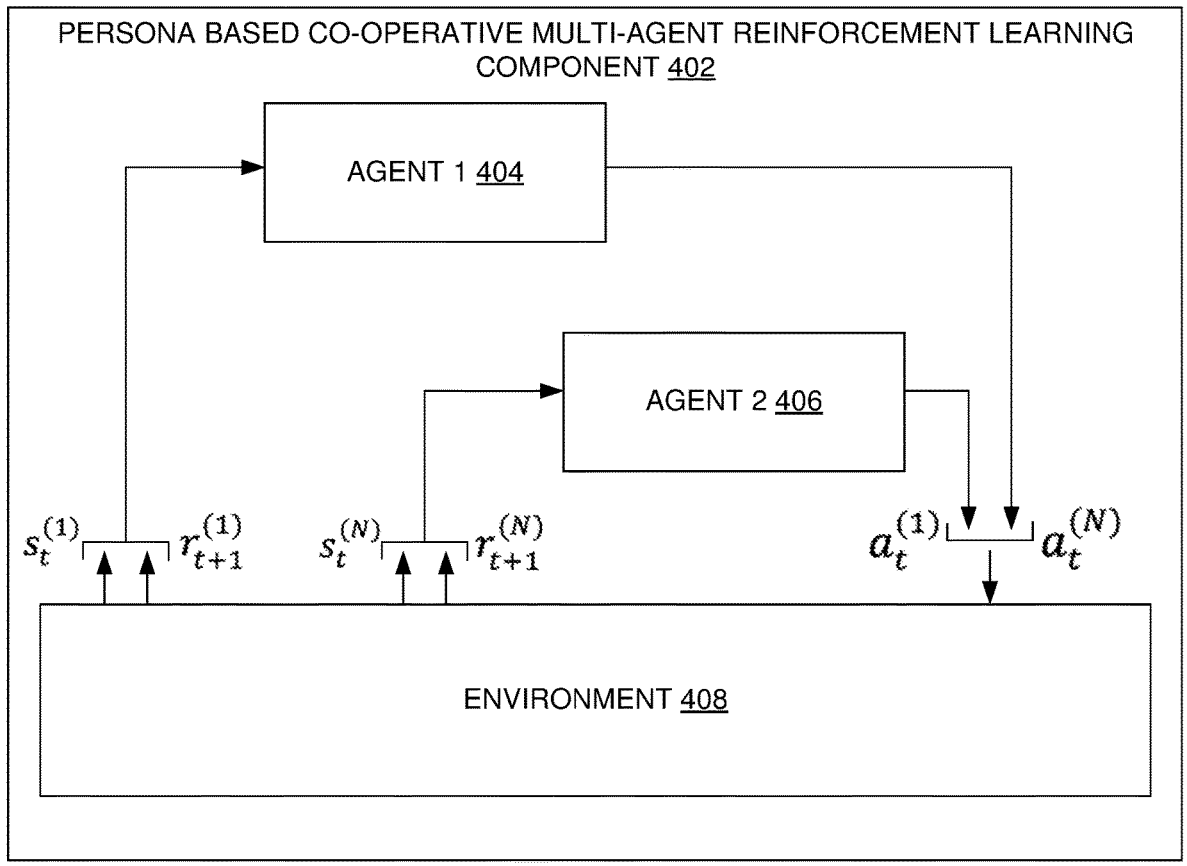
FIG. 4 illustrates an example system architecture of multi-agent reinforcement learning, and that can facilitate persona based co-operative multi-agent reinforcement learning, in accordance with an embodiment of this disclosure.

FIG. 4 illustrates an example system architecture 400 of multi-agent reinforcement learning, and that can facilitate persona based co-operative multi-agent reinforcement learning, in accordance with an embodiment of this disclosure. In some examples, system architecture 400 can be used to implement part(s) of persona based co-operative multi-agent reinforcement learning component 108 of FIG. 1.

As depicted, system architecture 400 comprises persona based co-operative multi-agent reinforcement learning component 402. In turn, persona based co-operative multi-agent reinforcement learning component 402 comprises agent 1 404, agent 2 406, and environment 408. Each of agent 1 404 and agent 2 406 can be similar to one of agents 110 of FIG. 1. Environment 408 can comprise a model of user interactions with a website, as described below.

In some examples, machine learning can be broadly divided into three sub-sections, namely supervised learning, unsupervised learning and reinforcement learning. In supervised and unsupervised learning, the learning can be performed on fixed datasets. However, in reinforcement learning (such as implemented by persona based co-operative multi-agent reinforcement learning component 402), the learning can be based on interactions with an environment (such as environment 408), which is modelled in the form of a Markov decision processes (MDP). A MDP can be described by a set of states S, a set of actions A, a stochastic transition function p(s, a, s') that describes stochastic system dynamics, and a reward function $R:S \times A \rightarrow R$. These rewards can act as feedback on the action taken by an agent that implements the MDP. The agent (e.g., agent 1 404 or agent 2 406) can learn, through the rewards, that good actions (e.g., actions that a designer of the system wants the agent to take, such as providing modules in a web page that are likely to lead to a sale) are encouraged while bad actions can be penalized through the rewards. A goal can be to find an optimal policy that maximizes expected rewards for each state.

In multi-agent reinforcement learning systems, multiple agents (e.g., agent 1 404 and agent 2 406) can work together in unison or against each other to achieve a global goal. These agents can be further partitioned into co-operative and competitive agents, depending on the behavior that they are to learn. The present techniques can adopt a cooperative multi-agent actor critic architecture, where several actors (agents) are utilized that learn an optimal (or otherwise advantageous) action to be taken provided, a current state as input. The critic (e.g., similar to critic component 112 of FIG. 1) in this architecture can be a centralized agent that, unlike the actors, has access to the actions taken by all the agents in the environment. The critic can predict an action value function, which can explain how optimal an action taken by the agent at a particular state was. This prediction can be used by the agents to regulate their actions, and push them toward performing actions that are highly optimal.

In the present techniques, supervised learning can be used to estimate an intent level of a user based on past interaction data, historical data, demographic data, and purchase data. Relationships between these visit level metrics and the intent to make a purchase can be identified. Neural networks can be used to make persona predictions about a user, as they can be powerful approximators used to learn a relationship between a set of inputs and an output.

Figure 5:
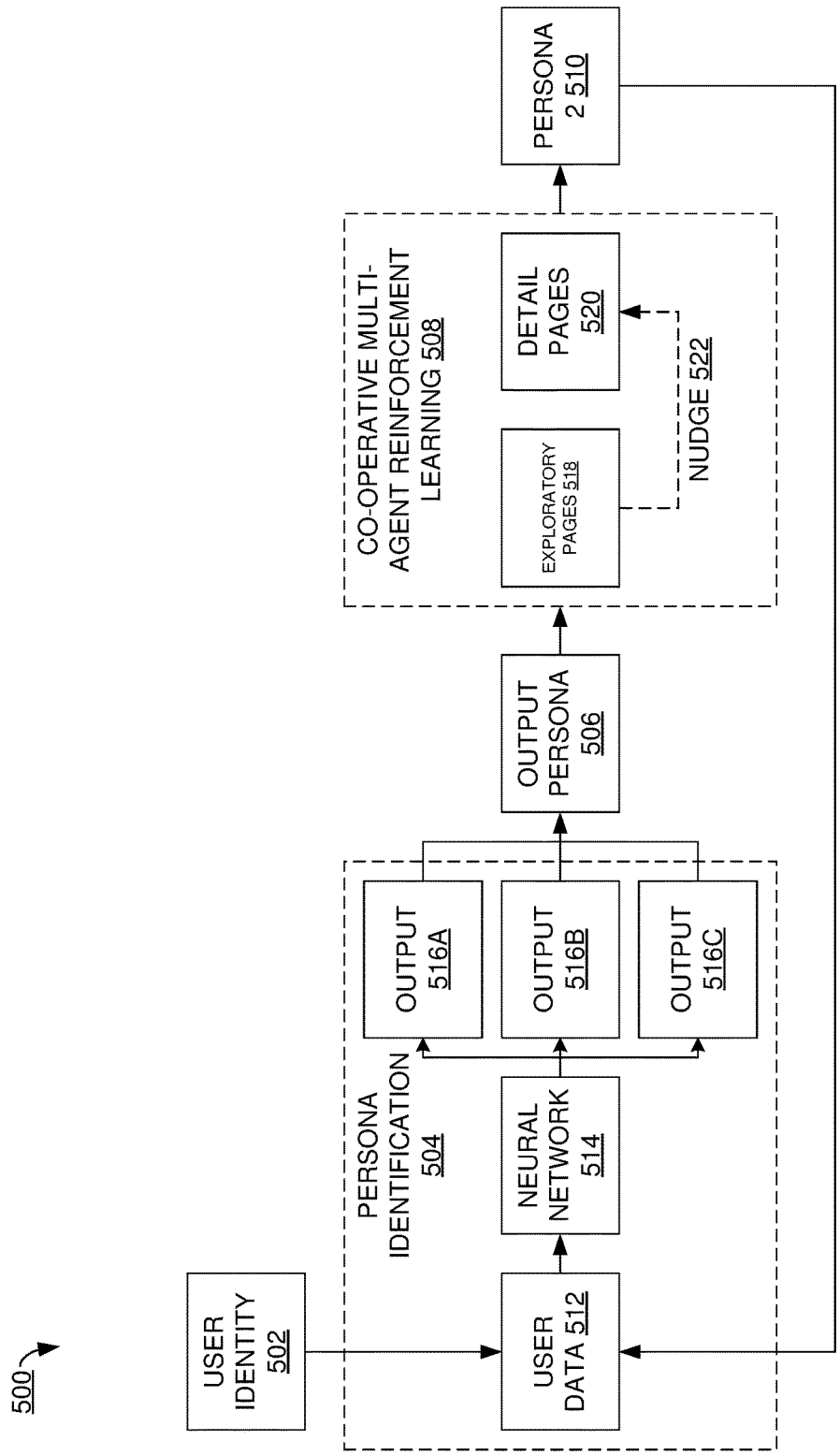
FIG. 5 illustrates an example system architecture of a hybrid supervised-multi-agent reinforcement learning system, and that can facilitate persona based co-operative multi-agent reinforcement learning, in accordance with an embodiment of this disclosure.

FIG. 5 illustrates an example system architecture 500 of a hybrid supervised-multi-agent reinforcement learning system, and that can facilitate persona based co-operative multi-agent reinforcement learning, in accordance with an embodiment of this disclosure. In some examples, system architecture 500 can be used to implement part(s) of persona based co-operative multi-agent reinforcement learning component 108 of FIG. 1.

System architecture 500 comprises user identity 502, persona identification 504, output persona 506, co-operative multi-agent reinforcement learning 508, and persona 2 510. In turn, persona identification 504 comprises user data 512, neural network 514, output 516A, output 516B, and output 516C. Co-operative multi-agent reinforcement learning 508 comprises exploratory pages 518, detail pages 520, and nudge 522.

Persona identification 504 can be implemented in a manner similar to system architecture 300 of FIG. 3. User identity 502 can be used to determine data about the user in user data 512. User data 512 can be input to neural network 514, which can produce output 516A, output 516B, and output 516C. Where there are N personas, neural network 514 can produce N outputs. Here, the example is of three personas (e.g., grazer, grasper, and purchaser). Of output 516A, output 516B, and output 516C, the output with the highest value can be determined as indicating the persona of user identity 502, and that output can be reflected in output persona 506.

Output persona 506 can be provided as input to co-operative multi-agent reinforcement learning 508, which can use that information to determine content to provide in web pages, such as described with respect to web page 202 of FIG. 2. As depicted, output persona 506 can be a grazer persona that is generally associated with exploratory pages 518 (e.g., web pages). Co-operative multi-agent reinforcement learning 508 can attempt to nudge 522 output persona 506 to visit detail pages 520 (e.g., web pages), and a next persona (e.g., from a grazer persona to a grasper persona), which can be reflected in persona 2 510.

Information from co-operative multi-agent reinforcement learning 508 and persona 2 510 can be incorporated in user data 512, and periodically used by persona identification 504 to update its output persona 506 for user identity 502, and/or train neural network 514.

Supervised learning for persona identification can be implemented as follows. A user's persona (e.g., output persona 506) can be determined based on past historical data, purchase data, demographic information, and past interaction data using artificial neural networks (e.g., neural network 514). These neural networks can predict a probability of users belonging to any of the three personas listed above. When this probability exceeds a set threshold value T, the user can be classified as belonging to the particular persona. Using the persona-pages mapping, page types can be identified for which experience can be enhanced. A sample, non-exhaustive table of inputs to a persona identification system can be as follows.

| Name | Description |
| --- | --- |
| Demand Generation | Vehicle through which user enters like Social Media, Paid Search etc. |
| Entry Page | Page through which user entered |
| Exit Page_n − 1 | Exit Page of previous visit |
| Time Spent on Site_n − 1 | Time spent on site during previous visit |
| Lifetime Visit number | Number of visits made to the website |
| Other | Other user related information |

Cooperative multi-agent reinforcement learning to enhance user experience can be implemented as follows. In some examples, web pages can be considered to be composed of different content modules (e.g., web page content modules 114 of FIG. 1). For example, the homepage of a website can contain different content modules, such as a module that holds a masthead, search and sign-in icons, a main banner module, a category ribbon module, and different product and deal banner modules. Each of these modules can be interdependent on each other, as users who cannot find what they are looking for in the in-page content, can provide increased engagement with options like the category ribbon or the search bar. This relationship between different modules on a page can be utilized for the modules to cooperate to achieve a page level optimization objective.

In some examples, each of the content modules can be modeled as a reinforcement learning agent. To formulate the problem as a MDP, states, actions, and reward for an agent can be defined. These can be defined as follows.

Regarding state space, a state denoted by $s_t$ can be a feature vector that describes content shown to the user on a webpage, and user-specific information like an entry page, a demand generation vehicle (e.g., paid search or social media), and the user's demographic information. A persona classification for the user during the $t^{th}$ visit to the website can also be utilized. A sample, non-exhaustive table of features to be considered for a state definition can be as follows.

| Name | Description |
| --- | --- |
| Persona | Persona predicted by supervised learning |
| Content Arrangement | If number of agents is N and each agent has k possible content variations then $\{c_1^2, c_2^4, c_1^3, \ldots, c_n^k\}$ |
| Demand Generation | Vehicle through which user enters like Social Media, Paid Search etc. |
| Entry Page | Page through which user entered |
| Exit Page_n − 1 | Exit Page of previous visit |
| Time Spent on Site_n − 1 | Time spent on site during previous visit |

-continued

| Name | Description |
| --- | --- |
| Lifetime Visit number | Number of visits made to the website |
| Other | Other user related information |

Regarding action space, each module can have a discrete set of content variations c={$c_1, c_2, c_3, \ldots, c_k$} that can be shown on them. The action $a_t$ of an agent can be the content $c_i^t$ to be shown on the module during $t^{th}$ visit.

Regarding rewards, a reward received by an agent when a user is classified as belonging to a persona can be defined as a linear combination of page-level experience metrics on corresponding pages, as follows:

$$r_{persona} = a * CTR - b * \text{Exit Rate}$$

In the above, a and b can each be scalars that identify a relative importance of a click through rate (CTR) compared to exits from pages in the reward (Exit Rate).

Given these example state, action, and reward definitions for each agent (e.g., content module present on a web page), a multi-agent actor critic architecture (e.g., as in co-operative multi-agent reinforcement learning 508) can be implemented to facilitate cooperation among different agents.

In actor-critic scenarios, a policy can be learned by an actor network that instructs an agent on an action to be taken, given the current state. The critic network can learn an action value function based on a current state and an action prescribed by an actor network. This action value function can signify an importance of taking a particular action at a particular state. The critic can provide feedback on the actor's predictions and facilitate the actor network in predicting actions that will help achieve an optimization objective.

Extending an actor-critic architecture to multi-agent systems, in some examples, each agent can correspond to an actor, and there can be a centralized critic that can provide feedback based on actions of all agents in the environment. A reward for facilitating cooperative behavior among agents can be as follows.

A reward formulation to drive users down a purchase funnel over subsequent visits can be implemented as follows. A reward can be redefined to facilitate learning behaviors where users are nudged over subsequent visits to move into a next persona, and move into a corresponding set of pages for a next persona. A reward function can incorporate predicted personas $n^{th}$ and next persona $(n+1)^{th}$, and a weightage assigned to $(n+1)^{th}$ in persona reward can be increased for each increasing episode.

The reward function can then be $r_{agent} = r_{persona}^n + A^{k} * r_{persona}^{(n+1)}$, where $r_{agent}$ is the agent's reward, $r_{persona}^n$ and $r_{persona}^{(n+1)}$ are the rewards obtained for the $n^{th}$ persona and $(n+1)^{th}$ persona on the corresponding pages for each persona, A>1, and k denotes a number of episodes where a user has crossed the threshold level and been classified as $n^{th}$ persona.

This can encourage agents on pages related to a $n^{th}$ persona to take actions that increase a reward related to a $(n+1)^{th}$ persona on subsequent visits (e.g., actions that will send users to $(n+1)^{th}$ persona pages). Where users are not satisfied with actions that take them to $(n+1)^{th}$ persona, user experience metrics on those pages can decrease, thereby causing $r_{persona}^{(n+1)}$ to decrease. This decreased reward can discourage agents from taking such actions again. Where reinforcement learning techniques can be based on trial and error, they implementations of reinforcement learning techniques can learn dynamically to adapt to corner cases.

Given agent-level reward definitions, a cooperative reward for multi-agent reinforcement learning systems can be defined as follows. This cooperative reward can be a sum of rewards of all agents on a given web page:

$$r_{multiagent} = \sum_{i=0}^{N} r_{agent}$$

Weights can be attached to rewards of agents based on their importance in an optimization objective. This reward can be received by each agent as a consequence of their actions, and each agent can work toward enhancing this overall reward, resulting in cooperation.

A feedback mechanism for persona identification can be implemented as follows. Multi-agent reinforcement learning agents can receive dynamic feedback based on rewards obtained for actions taken by them, but in some examples, a supervised machine learning based persona identification component lacks a closed-loop feedback system on an effect of reinforcement learning agents' actions to persona predictions. These models can be periodically retrained, both to maintain accuracy, and to understand a progression of users from $n^{th}$ persona to $(n+1)^{th}$ persona.

When the user enters the website, based on its past historical and purchase data, demographic information, and past interaction data, the user is classified as a "gazer." A homepage can be divided into different content modules, and each content module can be modeled as an agent. These agents can work cooperatively using multi-agent reinforcement learning to enhance a user's experience on a web page. These agents can also nudge (e.g., nudge 522) a user to move to a next persona ("grasper") through content shown on "exploratory" pages (e.g., exploratory pages 518) via "detail" pages (e.g., detail pages 520).

Based on the user's interaction with the content shown, the agents can receive rewards for their actions. In this example, the user liked the content shown, moved to "detail" pages and had a positive experience on the "detail" pages as well. So, the user, has now higher intent of purchasing and can be targeted accordingly on a next visit. A system that implements the present techniques can automatically learn this, as data can be updated to include user data obtained from a recent visit, and a supervised learning model can be periodically updated with this information. This approach can assist the model in understanding a transition of this user from "Gazer" to "Grasper".

This transition can happen over multiple visits, can happen on a different persona or web page, or may not happen at all. There are many possible cases that can be handled according to the present techniques, which can be a result of learning from trial and error rather than being based on a fixed dataset.

Example Graph

Figure 6:
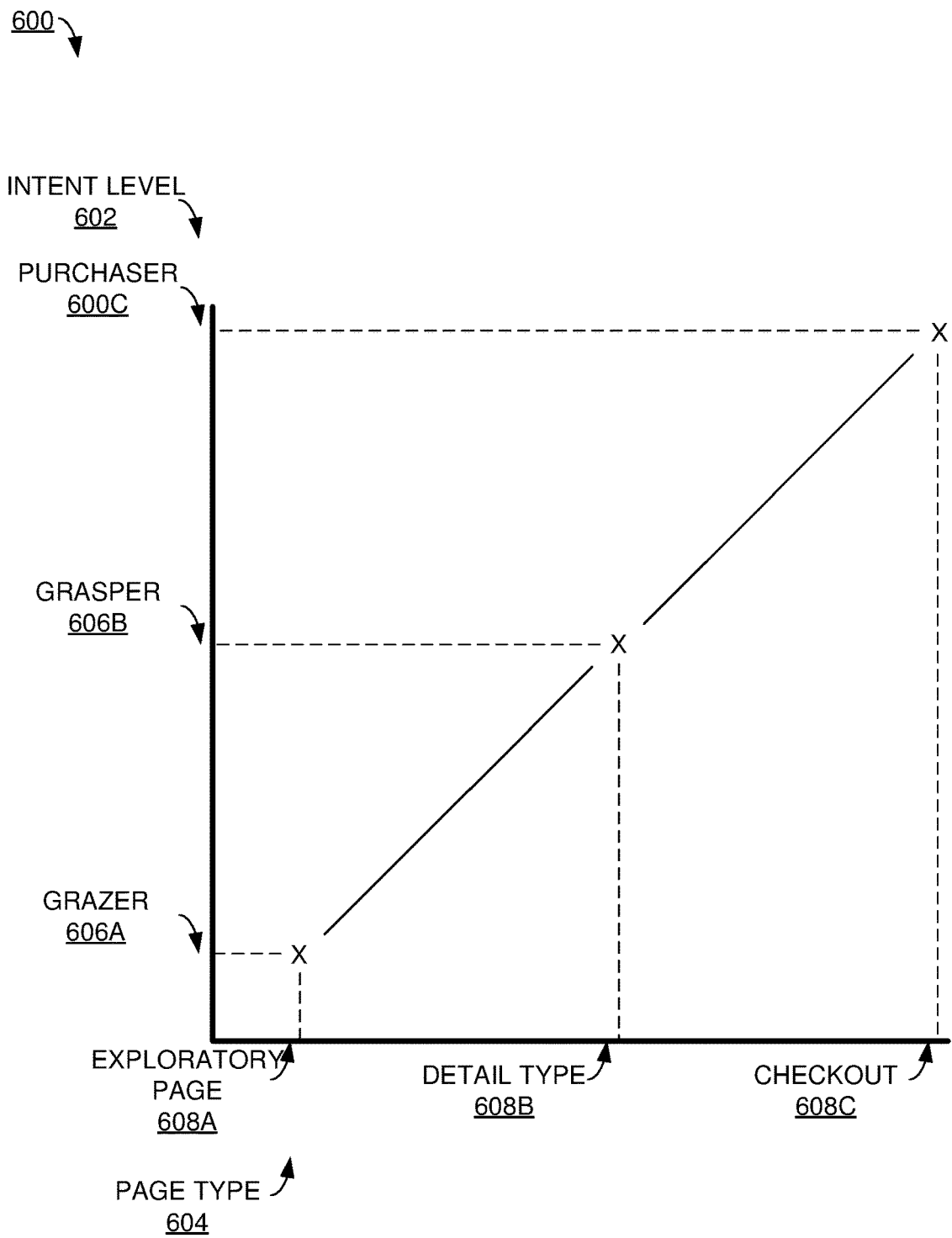
FIG. 6 illustrates an example graph of a persona-page mapping, and that can facilitate persona based co-operative multi-agent reinforcement learning, in accordance with an embodiment of this disclosure.

FIG. 6 illustrates an example graph 600 of a persona-page mapping, and that can facilitate persona based co-operative multi-agent reinforcement learning, in accordance with an embodiment of this disclosure.

In some examples, graph 600 can be used by persona based co-operative multi-agent reinforcement learning component 108 of FIG. 1 to implement co-operative multi-agent reinforcement learning.

Graph 600 comprises intent level 602 as the y-axis, and page type 604 as the x-axis. Different intents (which can be personas for a user identity) can be grazer 606A, grasper 606B, and purchaser 606C. Different page types (which can be types of web pages served by web server 106 of FIG. 1) can be exploratory page 608A, detail type 608B, and checkout 608C.

A user to a website can be mapped on a basis of level of intent, and kind of content they consume from the site. On the basis of content on the site, pages of a website can be divided into categories, such as "Exploratory", "Detail" and "Checkout" pages. "Exploratory" pages can be web pages that provide many options to the user, where the content is general, such as a homepage, a segment homepage, learn pages, and category pages. "Detail" pages can be web pages that provide product-specific content and where a user can compare different products to make a purchase-related decision, such as product detail pages (single/multiple), compare pages, and product search/filter results pages. "Checkout" pages can be web pages where users place an order, enter shipping details, and make a payment for their order, such as a cart page, a shipping page, a payment page, and a review page.

Users can be divided into multiple types, such as based on a level of indulgence with content shown to them, and a level of intent to make a purchase from the website. In some examples, there can be three different personas—"Gazer," "Grasper," and "Purchaser." A "gazer" persona can describe users who are just looking at, and exploring, the website, with low intent of buying. A "gasper" persona can describe users who have elevated levels of buying intent and are looking at product-level information to understand specifications. A "purchaser" persona can describe users who have a highest intent of buying of the personas.

The present techniques can be implemented to move users from a "gazer" or "grasper" persona to a "purchaser" persona through exploratory or detail web pages to checkout web pages over subsequent visits. This can be accomplished by enhancing a user experience for users having these respective personas on corresponding types of pages, respectively.

Example Process Flows

FIG. 7 illustrates another example process flow 700 that can facilitate persona based co-operative multi-agent reinforcement learning, in accordance with an embodiment of this disclosure. In some examples, one or more embodiments of process flow 700 can be implemented by persona based co-operative multi-agent reinforcement learning component 108 of FIG. 1, or computing environment 1000 of FIG. 10.

It can be appreciated that the operating procedures of process flow 700 are example operating procedures, and that there can be embodiments that implement more or fewer operating procedures than are depicted, or that implement the depicted operating procedures in a different order than as depicted. In some examples, process flow 700 can be implemented in conjunction with one or more embodiments of one or more of process flow 800 of FIG. 8, and/or process flow 900 of FIG. 9.

Process flow 700 begins with 702, and moves to operation 704. Operation 704 depicts determining a first persona for a user identity that has requested to access a website. In some examples, client computer 102 of FIG. 1 accesses a website hosted by web server 106, and a persona (e.g., output persona 506 of FIG. 5) for a user identity associated with client computer 102 can be determined.

In some examples, a neural network model performs the determining of the first persona based on input comprising information about the user identity, wherein the information about the user identity comprises demographic information, site interaction information, or past transaction information. This can comprise neural network 514, where user data 512 is the information about the user identity, and the first persona is output persona 506.

In some examples, operation 704 comprises periodically retraining the neural network model based on a first action of the group of actions taken by the reinforcement learning agents. That is, information from co-operative multi-agent reinforcement learning 508 can be used to retrain neural network 514.

After operation 704, process flow 700 moves to operation 706.

Operation 706 depicts generating a web page for the website based on the first persona, wherein respective reinforcement learning agents determine respective content of respective content modules of the website, wherein the respective reinforcement agents operate on an environment that comprises a group of states, a group of actions, and a group of rewards that are based on respective states of the group of states, and respective actions of the group of actions, and wherein a reward of the respective reinforcement learning agents that is increased via reinforcement learning is based on a sum of respective rewards of the respective reinforcement learning agents in transitioning the user identity to a second persona with respect to the website.

That is, based on the persona determined in operation 704, a web page can be generated co-operative using multi-agent reinforcement learning (where the agents can be agents 110 of FIG. 1), where the agents control respective content modules (e.g., web page content modules 114) on the web page. The agents can use a co-operative global reward, such as one administered by critic component 112.

In some examples, the reward is increased over subsequent user identity accesses of the website while the user identity is associated with the first persona and before the user identity is moved to the second persona. That is, a reward for moving to a next persona can be increased over subsequent user interactions.

In some examples, the sum is a first sum, wherein the respective rewards are first respective rewards, and wherein the reward is further based on a second sum of second respective rewards of the respective reinforcement learning agents in transitioning the user identity to a third persona with respect to the website. That is, the reward can be based on moving to the N persona, and the (N+1) persona, such as in $r_{agent} = r_{persona}^{n} + A^{k} * r_{persona}^{(n+1)}$.

In some examples, the user identity is transitioned to the third persona from the second persona. That is, using the grazer/grasper/purchaser persona example, a persona can start out as grazer (a first persona), then be transitioned to grasper (a second persona), and from there transitioned to purchaser (a third persona).

In some examples, the reward is determined based on a persona reward for the first persona that comprises a linear combination of page-level experience metrics of web pages of the website that correspond to the first persona. That is, the reward can be expressed as rpersona=a*CTR−b*Exit Rate.

In some examples, the reward is determined based on a combination of the persona reward, and a subsequent persona award, and wherein the subsequent persona reward is scaled by an increasingly large weight as the user identity takes actions that move the user identity to the second persona over successive visits to the website. That is, the reward can be expressed as $r_{agent} = r_{persona}^{n} + A^{k} * r_{persona}^{(n+1)}$.

After operation 706, process flow 700 moves to operation 708.

Operation 708 depicts, in response to receiving first action data indicative of user identity interaction with the web page, transitioning the user identity to the second persona with respect to the website. That is, user input can be received of doing something on the website to move the user identity to a next persona (e.g., from grazer to grasper). This can be, e.g., clicking on a particular link, or interacting with the web page in another manner.

After operation 708, process flow 700 moves to 710 where process flow 700 ends.

FIG. 8 illustrates another example process 800 flow that can facilitate persona based co-operative multi-agent reinforcement learning, in accordance with an embodiment of this disclosure. In some examples, one or more embodiments of process flow 800 can be implemented by persona based co-operative multi-agent reinforcement learning component 108 of FIG. 1, or computing environment 1000 of FIG. 10.

It can be appreciated that the operating procedures of process flow 800 are example operating procedures, and that there can be embodiments that implement more or fewer operating procedures than are depicted, or that implement the depicted operating procedures in a different order than as depicted. In some examples, process flow 800 can be implemented in conjunction with one or more embodiments of one or more of process flow 700 of FIG. 7, and/or process flow 900 of FIG. 9.

Process flow 800 begins with 802, and moves to operation 804. Operation 804 depicts determining a first persona for a user identity that accesses a user interface. In some examples, operation 804 can be implemented in a similar manner as operation 704 of FIG. 7.

In some examples, operation 804 comprises determining the first persona based on an output of a neural network model, wherein information about the user identity is input to the neural network model, and wherein the information about the user identity comprises demographic information, site interaction information, or past transaction information. This can comprise neural network 514, where user data 512 is the information about the user identity, and the first persona is output persona 506.

In some examples, operation 804 comprises obtaining a first likelihood that the first persona applies to the user identity and a second likelihood that a second persona applies to the user identity, wherein the first likelihood and the second likelihood are output by the neural network model in response to one set of inputs. That is, neural network 514 can output a likelihood that the user identity corresponds to each persona (e.g., output 516A, output 516B, and output 516C).

In some examples, operation 804 comprises determining that the first persona applies to the user identity based on the first likelihood being greater than a predetermined threshold value and the second likelihood being less than the predetermined threshold value. That is, a persona (e.g., output persona 506) can be selected from the various outputs of the neural network (e.g., output 516A, output 516B, and output 516C) that is above a threshold value.

In some examples, the first persona and the second persona indicate respective likelihoods of the user identity transacting via the user interface. That is, a persona can indicate a likelihood that a user identity will make a purchase.

After operation 804, process flow 800 moves to operation 806.

Operation 806 depicts generating user interface data for the user interface based on the first persona, wherein respective reinforcement learning agents determine respective content of respective portions of the user interface, wherein a reward of the respective reinforcement learning agents that is increased via reinforcement learning is a function of a sum of respective rewards of the respective reinforcement learning agents in moving the user identity to a second persona with respect to the user interface. In some examples, operation 806 can be implemented in a similar manner as operation 706 of FIG. 7.

In some examples, a critic component of the system has access to actions of the respective reinforcement learning agents, and wherein the critic component is configured to determine an action-value function from the actions of the respective reinforcement learning agents that indicates a value of an expected reward of the user identity taking a specified action with respect to the user interface. That is, there can be a critic-agent architecture, similar to critic component 112 and agents 110 of FIG. 10.

After operation 806, process flow 800 moves to operation 808.

Operation 808 depicts, in response to receiving first action data indicative of user identity interaction with the user interface, moving the user identity to the second persona with respect to the user interface. In some examples, operation 808 can be implemented in a similar manner as operation 708 of FIG. 7.

After operation 808, process flow 800 moves to 810, where process flow 800 ends.

FIG. 9 illustrates another example process flow 900 that can facilitate persona based co-operative multi-agent reinforcement learning, in accordance with an embodiment of this disclosure. In some examples, one or more embodiments of process flow 900 can be implemented by persona based co-operative multi-agent reinforcement learning component 108 of FIG. 1, or computing environment 1000 of FIG. 10.

It can be appreciated that the operating procedures of process flow 900 are example operating procedures, and that there can be embodiments that implement more or fewer operating procedures than are depicted, or that implement the depicted operating procedures in a different order than as depicted. In some examples, process flow 900 can be implemented in conjunction with one or more embodiments of one or more of process flow 700 of FIG. 7, and/or process flow 800 of FIG. 8.

Process flow 900 begins with 902, and moves to operation 904. Operation 904 depicts generating user interface data for a user interface based on a first persona that is associated with a user identity, wherein respective reinforcement learning agents determine respective content of respective portions of the user interface, wherein a reward of the respective reinforcement learning agents is increased via reinforcement learning, and wherein the reward is a sum of respective rewards of the respective reinforcement learning agents in migrating the user identity to a second persona with respect to the user interface. In some examples, operation 904 can be implemented in a similar manner as operations 704-706 of FIG. 7.

In some examples, operation 904 comprises determining that the first persona is associated with the user identity based on an output of a neural network model.

In some examples, operation 904 comprises retraining the neural network model based on information determined from the reinforcement learning agents.

In some examples, the first persona indicates a first likelihood that the user identity will make a purchase via the user interface, wherein the second persona indicates a second likelihood that the user identity will make the purchase via the user interface, and wherein the second likelihood is greater than the first likelihood. That is, there can be multiple personas, each of which indicates a likelihood that a user identity will make a purchase. For example, there can be the grazer persona, the grasper persona that indicates a higher likelihood of making a purchase than the grazer persona, and the purchaser persona that indicates a higher likelihood of making a purchase than the grasper persona.

In some examples, the respective reinforcement learning agents perform learning based on interactions by the user identity with an environment comprising the user interface that is modeled by a Markov decision process. In some examples, a state of the Markov decision process comprises at least one of the first persona, an arrangement of content in the user interface, a source from which the user identity accessed the user interface, a time spent with the user interface by the user identity during a previous visit, or a number of visits to the user interface made by the user identity.

After operation 904, process flow 900 moves to operation 906.

Operation 906 depicts, in response to receiving first action data indicative of user identity interaction with the user interface, migrating the user identity to the second persona with respect to the user interface. In some examples, operation 906 can be implemented in a similar manner as operation 708 of FIG. 7.

After operation 906, process flow 900 moves to 908, where process flow 900 ends.

Example Operating Environment

In order to provide additional context for various embodiments described herein, FIG. 10 and the following discussion are intended to provide a brief, general description of a suitable computing environment 1000 in which the various embodiments of the embodiment described herein can be implemented.

For example, parts of computing environment 1000 can be used to implement one or more embodiments of client computer 102 and/or web server 106 of FIG. 1.

In some examples, computing environment 1000 can implement one or more embodiments of the process flows of FIGS. 7-9 to facilitate persona based co-operative multi-agent reinforcement learning.

While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the various methods can be practiced with other computer system configurations, including single-processor or multiprocessor computer systems, minicomputers, mainframe computers, Internet of Things (IoT) devices, distributed computing systems, as well as personal computers, hand-held computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 10, the example environment 1000 for implementing various embodiments described herein includes a computer 1002, the computer 1002 including a processing unit 1004, a system memory 1006 and a system bus 1008. The system bus 1008 couples system components including, but not limited to, the system memory 1006 to the processing unit 1004. The processing unit 1004 can be any of various commercially available processors. Dual microprocessors and other multi-processor architectures can also be employed as the processing unit 1004.

The system bus 1008 can be any of several types of bus structure that can further interconnect to a memory bus (with or without a memory controller), a peripheral bus, and a local bus using any of a variety of commercially available bus architectures. The system memory 1006 includes ROM 1010 and RAM 1012. A basic input/output system (BIOS) can be stored in a nonvolatile storage such as ROM, erasable programmable read only memory (EPROM), EEPROM, which BIOS contains the basic routines that help to transfer information between elements within the computer 1002, such as during startup. The RAM 1012 can also include a high-speed RAM such as static RAM for caching data.

The computer 1002 further includes an internal hard disk drive (HDD) 1014 (e.g., EIDE, SATA), one or more external storage devices 1016 (e.g., a magnetic floppy disk drive (FDD) 1016, a memory stick or flash drive reader, a memory card reader, etc.) and an optical disk drive 1020 (e.g., which can read or write from a CD-ROM disc, a DVD, a BD, etc.). While the internal HDD 1014 is illustrated as located within the computer 1002, the internal HDD 1014 can also be configured for external use in a suitable chassis (not shown). Additionally, while not shown in environment 1000, a solid state drive (SSD) could be used in addition to, or in place of, an HDD 1014. The HDD 1014, external storage device(s) 1016 and optical disk drive 1020 can be connected to the system bus 1008 by an HDD interface 1024, an external storage interface 1026 and an optical drive interface 1028, respectively. The interface 1024 for external drive implementations can include at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 1002, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1012, including an operating system 1030, one or more application programs 1032, other program modules 1034 and program data 1036. All or portions of the operating system, applications, modules, and/or data can also be cached in the RAM 1012. The systems and methods described herein can be implemented utilizing various commercially available operating systems or combinations of operating systems.

Computer 1002 can optionally comprise emulation technologies. For example, a hypervisor (not shown) or other intermediary can emulate a hardware environment for operating system 1030, and the emulated hardware can optionally be different from the hardware illustrated in FIG. 10. In such an embodiment, operating system 1030 can comprise one virtual machine (VM) of multiple VMs hosted at computer 1002. Furthermore, operating system 1030 can provide runtime environments, such as the Java runtime environment or the .NET framework, for applications 1032. Runtime environments are consistent execution environments that allow applications 1032 to run on any operating system that includes the runtime environment. Similarly, operating system 1030 can support containers, and applications 1032 can be in the form of containers, which are lightweight, standalone, executable packages of software that include, e.g., code, runtime, system tools, system libraries and settings for an application.

Further, computer 1002 can be enabled with a security module, such as a trusted processing module (TPM). For instance, with a TPM, boot components hash next in time boot components, and wait for a match of results to secured values, before loading a next boot component. This process can take place at any layer in the code execution stack of computer 1002, e.g., applied at the application execution level or at the operating system (OS) kernel level, thereby enabling security at any level of code execution.

A user can enter commands and information into the computer 1002 through one or more wired/wireless input devices, e.g., a keyboard 1038, a touch screen 1040, and a pointing device, such as a mouse 1042. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 1004 through an input device interface 1044 that can be coupled to the system bus 1008, but can be connected by other interfaces, such as a parallel port, an IEEE 1394 serial port, a game port, a USB port, an IR interface, a BLUETOOTH® interface, etc.

A monitor 1046 or other type of display device can be also connected to the system bus 1008 via an interface, such as a video adapter 1048. In addition to the monitor 1046, a computer typically includes other peripheral output devices (not shown), such as speakers, printers, etc.

The computer 1002 can operate in a networked environment using logical connections via wired and/or wireless communications to one or more remote computers, such as a remote computer(s) 1050. The remote computer(s) 1050 can be a workstation, a server computer, a router, a personal computer, portable computer, microprocessor-based entertainment appliance, a peer device or other common network node, and typically includes many or all of the elements described relative to the computer 1002, although, for purposes of brevity, only a memory/storage device 1052 is illustrated. The logical connections depicted include wired/wireless connectivity to a local area network (LAN) 1054 and/or larger networks, e.g., a wide area network (WAN) 1056. Such LAN and WAN networking environments are commonplace in offices and companies, and facilitate enterprise-wide computer networks, such as intranets, all of which can connect to a global communications network, e.g., the Internet.

When used in a LAN networking environment, the computer 1002 can be connected to the local network 1054 through a wired and/or wireless communication network interface or adapter 1058. The adapter 1058 can facilitate wired or wireless communication to the LAN 1054, which can also include a wireless access point (AP) disposed thereon for communicating with the adapter 1058 in a wireless mode.

When used in a WAN networking environment, the computer 1002 can include a modem 1060 or can be connected to a communications server on the WAN 1056 via other means for establishing communications over the WAN 1056, such as by way of the Internet. The modem 1060, which can be internal or external and a wired or wireless device, can be connected to the system bus 1008 via the input device interface 1044. In a networked environment, program modules depicted relative to the computer 1002 or portions thereof, can be stored in the remote memory/storage device 1052. It will be appreciated that the network connections shown are examples, and other means of establishing a communications link between the computers can be used.

When used in either a LAN or WAN networking environment, the computer 1002 can access cloud storage systems or other network-based storage systems in addition to, or in place of, external storage devices 1016 as described above. Generally, a connection between the computer 1002 and a cloud storage system can be established over a LAN 1054 or WAN 1056 e.g., by the adapter 1058 or modem 1060, respectively. Upon connecting the computer 1002 to an associated cloud storage system, the external storage interface 1026 can, with the aid of the adapter 1058 and/or modem 1060, manage storage provided by the cloud storage system as it would other types of external storage. For instance, the external storage interface 1026 can be configured to provide access to cloud storage sources as if those sources were physically connected to the computer 1002.

The computer 1002 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

CONCLUSION

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory in a single machine or multiple machines. Additionally, a processor can refer to an integrated circuit, a state machine, an application specific integrated circuit (ASIC), a digital signal processor (DSP), a programmable gate array (PGA) including a field programmable gate array (FPGA), a programmable logic controller (PLC), a complex programmable logic device (CPLD), a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor may also be implemented as a combination of computing processing units. One or more processors can be utilized in supporting a virtualized computing environment. The virtualized computing environment may support one or more virtual machines representing computers, servers, or other computing devices. In such virtualized virtual machines, components such as processors and storage devices may be virtualized or logically represented. For instance, when a processor executes instructions to perform "operations", this could include the processor performing the operations directly and/or facilitating, directing, or cooperating with another device or component to perform the operations.

In the subject specification, terms such as "datastore," "data storage," "database," "cache," and substantially any other information storage component relevant to operation and functionality of a component, refer to "memory components," or entities embodied in a "memory" or components comprising the memory. It will be appreciated that the memory components, or computer-readable storage media, described herein can be either volatile memory or nonvolatile storage, or can include both volatile and nonvolatile storage. By way of illustration, and not limitation, nonvolatile storage can include ROM, programmable ROM (PROM), EPROM, EEPROM, or flash memory. Volatile memory can include RAM, which acts as external cache memory. By way of illustration and not limitation, RAM can be available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

The illustrated embodiments of the disclosure can be practiced in distributed computing environments where certain tasks are performed by remote processing devices that are linked through a communications network. In a distributed computing environment, program modules can be located in both local and remote memory storage devices.

The systems and processes described above can be embodied within hardware, such as a single integrated circuit (IC) chip, multiple ICs, an ASIC, or the like. Further, the order in which some or all of the process blocks appear in each process should not be deemed limiting. Rather, it should be understood that some of the process blocks can be executed in a variety of orders that are not all of which may be explicitly illustrated herein.

As used in this application, the terms "component," "module," "system," "interface," "cluster," "server," "node," or the like are generally intended to refer to a computer-related entity, either hardware, a combination of hardware and software, software, or software in execution or an entity related to an operational machine with one or more specific functionalities. For example, a component can be, but is not limited to being, a process running on a processor, a processor, an object, an executable, a thread of execution, computer-executable instruction(s), a program, and/or a computer. By way of illustration, both an application running on a controller and the controller can be a component. One or more components may reside within a process and/or thread of execution and a component may be localized on one computer and/or distributed between two or more computers. As another example, an interface can include input/output (I/O) components as well as associated processor, application, and/or application programming interface (API) components.

Further, the various embodiments can be implemented as a method, apparatus, or article of manufacture using standard programming and/or engineering techniques to produce software, firmware, hardware, or any combination thereof to control a computer to implement one or more embodiments of the disclosed subject matter. An article of manufacture can encompass a computer program accessible from any computer-readable device or computer-readable storage/ communications media. For example, computer readable storage media can include but are not limited to magnetic storage devices (e.g., hard disk, floppy disk, magnetic strips . . . ), optical discs (e.g., CD, DVD . . . ), smart cards, and flash memory devices (e.g., card, stick, key drive . . . ). Of course, those skilled in the art will recognize many modifications can be made to this configuration without departing from the scope or spirit of the various embodiments.

In addition, the word "example" or "exemplary" is used herein to mean serving as an example, instance, or illustration. Any embodiment or design described herein as "exemplary" is not necessarily to be construed as preferred or advantageous over other embodiments or designs. Rather, use of the word exemplary is intended to present concepts in a concrete fashion. As used in this application, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

What has been described above includes examples of the present specification. It is, of course, not possible to describe every conceivable combination of components or methods for purposes of describing the present specification, but one of ordinary skill in the art may recognize that many further combinations and permutations of the present specification are possible. Accordingly, the present specification is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A system, comprising:
a processor; and
a memory that stores executable instructions that, when executed by the processor, facilitate performance of operations, comprising:
   determining a first persona for a user identity that has requested to access a website;
   determining a number of visits, associated with the user identity, made to the website while the user identity has been associated with the first persona;
   determining a reward for respective reinforcement learning agents based on the user identity becoming associated with a second persona with respect to the website, wherein the reward is increased as the number of visits, associated with the user identity, made to the website while the user identity has been associated with the first persona increases, and wherein the reward is determined independently of the user account becoming associated with an intermediate persona between the first persona and the second persona;
   generating a web page for the website based on the first persona,
      wherein the respective reinforcement learning agents determine respective content of respective content modules of the website,
      wherein the respective reinforcement agents operate on an environment that comprises a group of states, a group of actions, a group of rewards that are based on respective states of the group of states, wherein the group of rewards comprises the reward, and respective actions of the group of actions, and
      wherein the reward for the respective reinforcement learning agents is based on a sum of respective rewards of the respective reinforcement learning agents in transitioning the user identity to the second persona with respect to the website; and
   in response to receiving first action data indicative of user identity interaction with the web page, transitioning the user identity to the second persona with respect to the website.

2. The system of claim 1, wherein a neural network model performs the determining of the first persona based on input comprising information about the user identity, wherein the information about the user identity comprises demographic information, site interaction information, or past transaction information.

3. The system of claim 2, wherein the operations further comprise:
periodically retraining the neural network model based on a first action of the group of actions taken by the reinforcement learning agents.

4. The system of claim 1, wherein the sum is a first sum, wherein the respective rewards are first respective rewards, and wherein the reward is further based on a second sum of second respective rewards of the respective reinforcement learning agents in transitioning the user identity to a third persona with respect to the website.

5. The system of claim 4, wherein the user identity is transitioned to the third persona from the second persona.

6. The system of claim 1, wherein the reward is determined based on a persona reward for the first persona that comprises a linear combination of page-level experience metrics of web pages of the website that correspond to the first persona.

7. The system of claim 6, wherein the reward is determined based on a combination of the persona reward, and a subsequent persona reward that is associated with the second persona, and wherein the subsequent persona reward is scaled by an increasingly large weight as the user identity takes actions that move the user identity to the second persona over successive visits to the website.

8. A method, comprising:
determining, by a system comprising a processor, a first persona for a user identity that accesses a user interface;
determining, by the system a number of visits, corresponding to the user identity, to the user interface while the user identity has been associated with the first persona;
determining, by the system, a reward for respective reinforcement learning agents based on the user identity becoming associated with a second persona with respect to the user interface, wherein the reward is increased as the number of visits, corresponding to the user identity, to the user interface while the user identity has been associated with the first persona increases;
generating, by the system, user interface data for the user interface based on the first persona, wherein respective reinforcement learning agents determine respective content of respective portions of the user interface, wherein the reward of the respective reinforcement learning agents is a function of a sum of respective rewards of the respective reinforcement learning agents in moving the user identity to the second persona with respect to the user interface; and in response to receiving first action data indicative of user identity interaction with the user interface, moving, by the system, the user identity to the second persona with respect to the user interface.

9. The method of claim 8, further comprising:

determining, by the system, the first persona based on an output of a neural network model, wherein information about the user identity is input to the neural network model, and wherein the information about the user identity comprises demographic information, site interaction information, or past transaction information.

10. The method of claim 9, further comprising:

obtaining, by the system, a first likelihood that the first persona applies to the user identity and a second likelihood that the second persona applies to the user identity, wherein the first likelihood and the second likelihood are output by the neural network model in response to one set of inputs.

11. The method of claim 10, further comprising:

determining, by the system, that the first persona applies to the user identity based on the first likelihood being greater than a predetermined threshold value and the second likelihood being less than the predetermined threshold value.

12. The method of claim 8, wherein a critic component of the system has access to actions of the respective reinforcement learning agents, and wherein the critic component is configured to determine an action-value function from the actions of the respective reinforcement learning agents that indicates a value of an expected reward of the user identity taking a specified action with respect to the user interface.

13. The method of claim 8, wherein the first persona and the second persona indicate respective likelihoods of the user identity transacting via the user interface.

14. A non-transitory computer-readable medium comprising instructions that, in response to execution, cause a system comprising a processor to perform operations, comprising:

determining a reward for respective reinforcement learning agents based on a user that is associated with a first persona becoming associated with a second persona with respect to a user interface, wherein the reward is increased as a number of interactions that the user makes with the user interface while the user has been associated with the first persona increases;

generating user interface data for the user interface based on the first persona that is associated with the user, wherein respective reinforcement learning agents determine respective content of respective portions of the user interface, wherein the reward of the respective reinforcement learning agents is increased via reinforcement learning, and wherein the reward is a sum of respective rewards of the respective reinforcement learning agents in migrating the user to the second persona with respect to the user interface; and in response to receiving first action data indicative of user identity interaction with the user interface, migrating the user to the second persona with respect to the user interface.

15. The non-transitory computer-readable medium of claim 14, wherein the operations further comprise:

determining that the first persona is associated with the user based on an output of a neural network model.

16. The non-transitory computer-readable medium of claim 15, wherein the operations further comprise:

retraining the neural network model based on information determined from the reinforcement learning agents.

17. The non-transitory computer-readable medium of claim 14, wherein the first persona indicates a first likelihood that the user will make a purchase via the user interface, wherein the second persona indicates a second likelihood that the user will make the purchase via the user interface, and wherein the second likelihood is greater than the first likelihood.

18. The non-transitory computer-readable medium of claim 14, wherein the respective reinforcement learning agents perform learning based on interactions by the user with an environment comprising the user interface that is modeled by a Markov decision process.

19. The non-transitory computer-readable medium of claim 18, wherein a state of the Markov decision process comprises at least one of the first persona, an arrangement of content in the user interface, a source from which the user accessed the user interface, a time spent with the user interface by the user during a previous visit, or a number of visits to the user interface made by the user.

20. The method of claim 8, wherein the reward is determined based on a combination of the persona reward, and a subsequent persona reward that is associated with the second persona, and wherein the subsequent persona reward is scaled by an increasingly larger weight as the user identity is associated with taking actions that move the user identity to the second persona over successive visits to the website.

* * * * *